United States Patent [19]
Peng

[11] Patent Number: 4,756,277
[45] Date of Patent: Jul. 12, 1988

[54] AUTOMATIC PET FOOD FEEDER

[76] Inventor: Douglas C. Peng, 2380 Mississauga Road, Mississaga, Ontario, Canada, L5H 2L1

[21] Appl. No.: 946,597

[22] Filed: Dec. 29, 1986

[51] Int. Cl.[4] .................... A01K 5/02; A01K 39/012
[52] U.S. Cl. ............................. 49/51.11; 119/52 AF
[58] Field of Search ............ 119/51.11, 52.12, 52 R, 119/52 AF, 51 R; 222/198, 199, 196, 650, 202

[56] References Cited

U.S. PATENT DOCUMENTS

| | | | |
|---|---|---|---|
| 2,446,752 | 8/1948 | Fiddyment | 222/198 |
| 3,376,856 | 4/1968 | Crippen | 119/51.11 |
| 3,716,172 | 2/1973 | Crippen | 119/52 AF |
| 4,497,133 | 2/1985 | Blenkinsop | 119/51 R |
| 4,688,520 | 8/1987 | Parks | 119/51.11 |

FOREIGN PATENT DOCUMENTS 2584208  1/1987  France ................ 119/51.11

Primary Examiner—Paul J. Hirsch
Assistant Examiner—Vincent Ciamacco
Attorney, Agent, or Firm—David W. Wong

[57] ABSTRACT

The automatic feeder is for dispensing dry pet food. It has a generally rectangular housing having three downwardly sloping platforms located one over another in a zig zag manner. The platforms separate the interior of the housing into a top storage chamber, a middle chamber and a bottom chamber. The bottom chamber has a side dispensing opening. Food pellets in the top storage chamber slide from the top platform onto the middle platform in the middle chamber. The middle platform has a vibration means mounted thereto. The vibration means is actuated for a predetermined time interval to cause an amount of food pellets to transfer from the middle platform into the bottom chamber. The dispensing opening is provided with a vertical pivotal swingable trap door which is normally resting in a closed position due to gravity, but is held tightly shut by a latching device which is actuated for the same time interval while the vibration means is actuated. The trap door is released at the end of the time interval so as to allow the food pellets now located in the bottom chamber to fall out through the dispensing opening into a feed bowl located below the feeder.

14 Claims, 4 Drawing Sheets

AUTOMATIC PET FOOD FEEDER

BACKGROUND OF THE INVENTION

This invention relates to a feeding apparatus and particularly to an automatic feeder of dry food for domestic animals.

It is increasingly common nowadays that in many occasions a pet owner has to be away from home for a short period of time from one day to several days. In the owner's absence the pet such as a cat or a dog must still be properly fed. Numerous types of feeders have been designed for feeding domestic animals so that the pet owner no longer needs to board the pet in a kennel or to rely on friends to feed it. However, a common drawback in known feeders is that they are prone to malfunctioning. The reason for the malfunctioning is mainly due to that the dry food pellets used with the feeder cause congestion or jamming of its moving parts. Since only dry pet food may be stored and used with such device for a considerable length of time without becoming spoiled, the jamming problem cannot be overcome. Accordingly, known feeders are not reliable. Furthermore, known feeders are rather complex in construction. Thus, they are difficult and expensive to manufacture.

OBJECT OF THE INVENTION

It is a principal object of the present invention to provide a realiable automatic domestic pet food feeder which does not have any moving parts that can become jammed by dry food pellets.

It is an object of the present invention to provide an automatic domestic pet food feeder which is simple in construction, and which allows the pet owner to adjust the volume of food in each feeding.

It is another object of the present invention to provide a feeder which can be readily cleaned without much difficulty.

SUMMARY OF THE INVENTION

The automatic animal dry food pellets dispensing apparatus comprises a top rectangular housing having a bottom side dispensing opening and a plurality of vertically located consecutive chambers formed by at least three sloping platforms located in a zig zag manner in the housing. The platforms comprise a top platform extending slopingly downwardly from a first side wall of the housing towards an opposite second side wall and it has a free end space from the opposite side wall. Thus, the top holding platform forms a bottom panel of the top chamber which stores a large amount of food pellets therein and its lower end forms an opening adjacent the second side wall. A middle platform is located in a spaced manner below the top holding platform to form a middle chamber below the top chamber. The middle platform extends from the second side wall slopingly downwardly towards the one side wall and it has a free end forming an opening adjacent the first side wall. A bottom platform is located in a spaced manner below the middle platform to form a feed chamber below the middle chamber. The bottom platform slopes downwardly towards the side dispensing opening, and it is also vertically adjustable to vary the capacity of the feed chamber. A swingable trap door is vertically and pivotally mounted at the dispensing opening. Hung by the pivots, the trap door normally rests in a vertical position. A vibration device is mounted at the underside of the middle platform. The vibration means is actuated by a timer control to provide a vibration motion at the middle platform for a predetermined length of time so as to cause a predetermined amount of food pellets to transfer from the middle platform to the bottom feed chamber. The trap door is held closed by a latching means which is actuated simultaneously but the control timer for the same length of time the vibration device is actuated. The vibration device and the trap door latch are deactuated at the end of the food transfer, so that the food pellets in the feed chamber will push the trap door open by gravity and fall through the dispensing opening into a food bowl located below the feeder for consumption by the pet.

BRIEF DESCRIPTION OF THE DRAWINGS

Other objects of this invention will appear in the following description and appended claims, reference being made to the accompanying drawings forming a part of the specification wherein like reference numerals designate corrresponding parts in the several views.

DESCRIPTION OF SPECIFIC EMBODIMENTS

Figure 1:
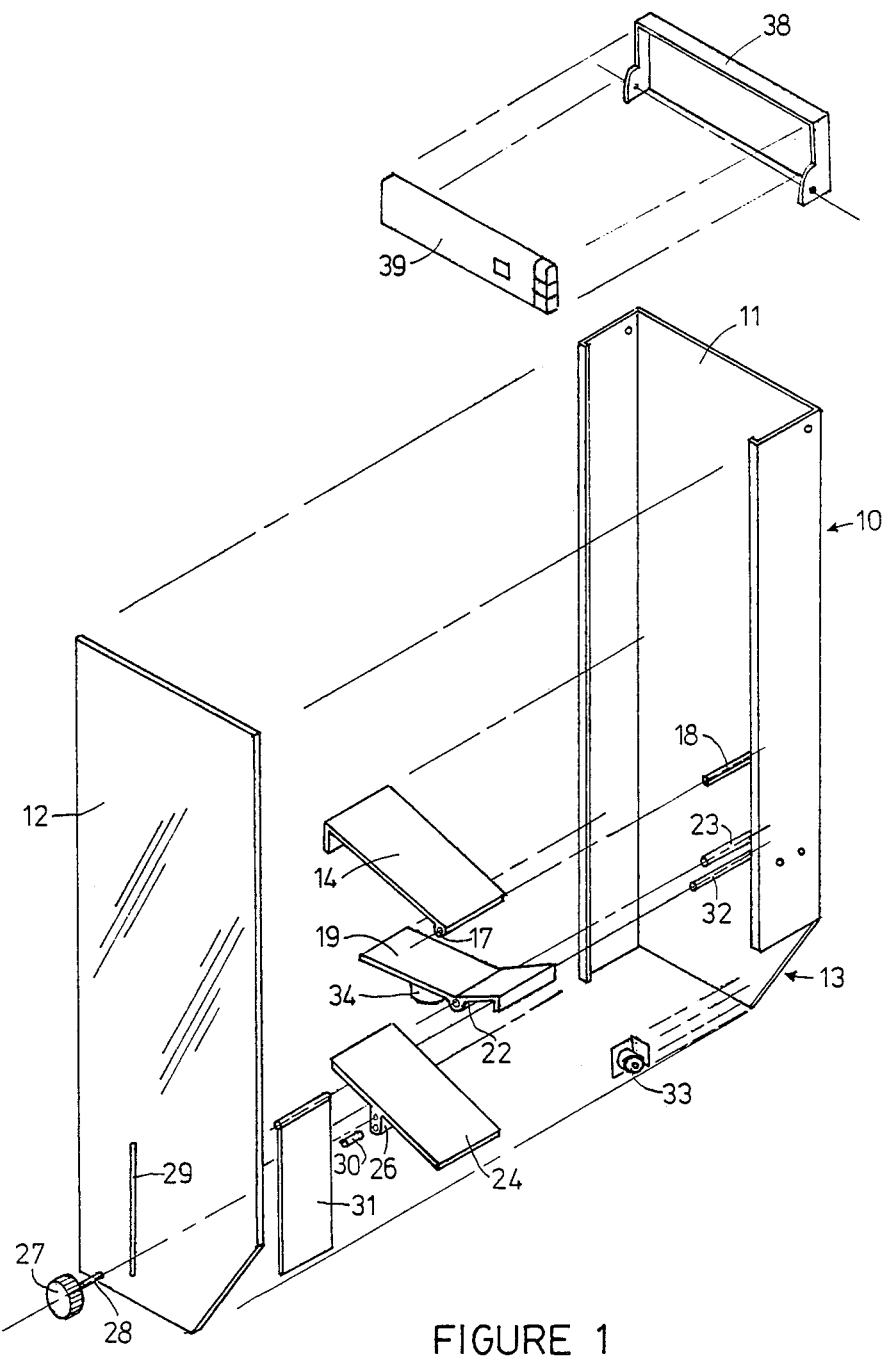
FIG. 1 is an exploded perspective view of a feeder showing one embodiment of the apparatus according to the present invention.
Figure 2:
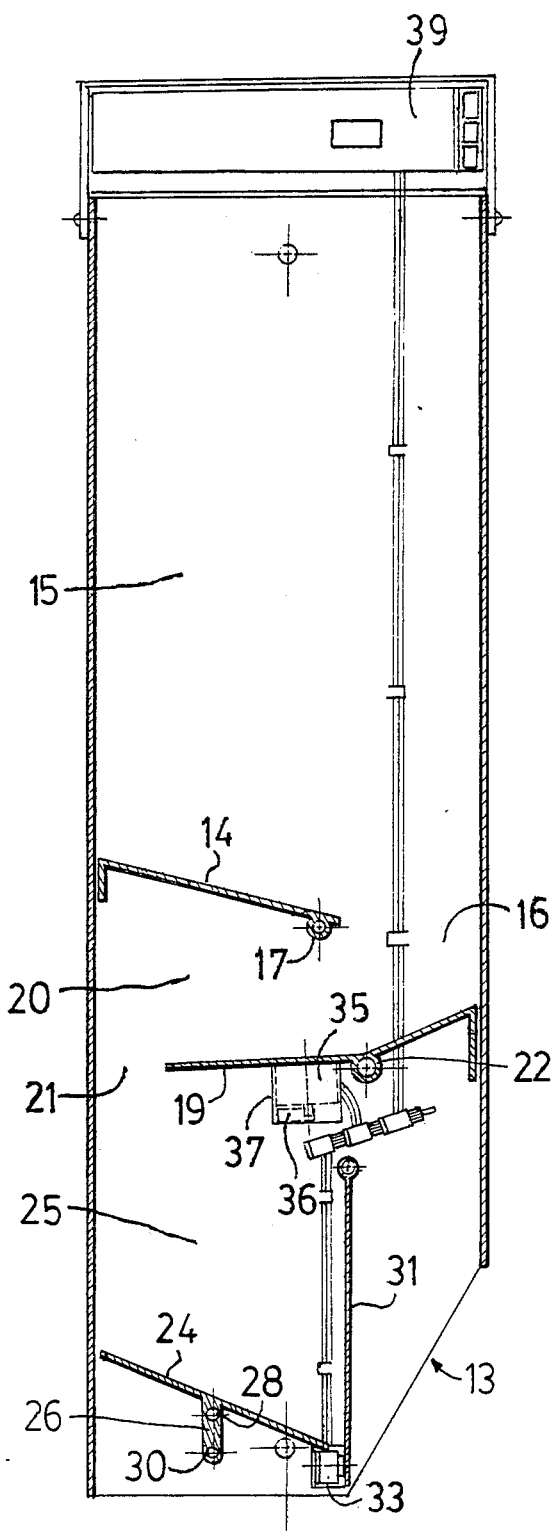
FIG. 2 is a front sectional elevation view thereof.
Figure 3:
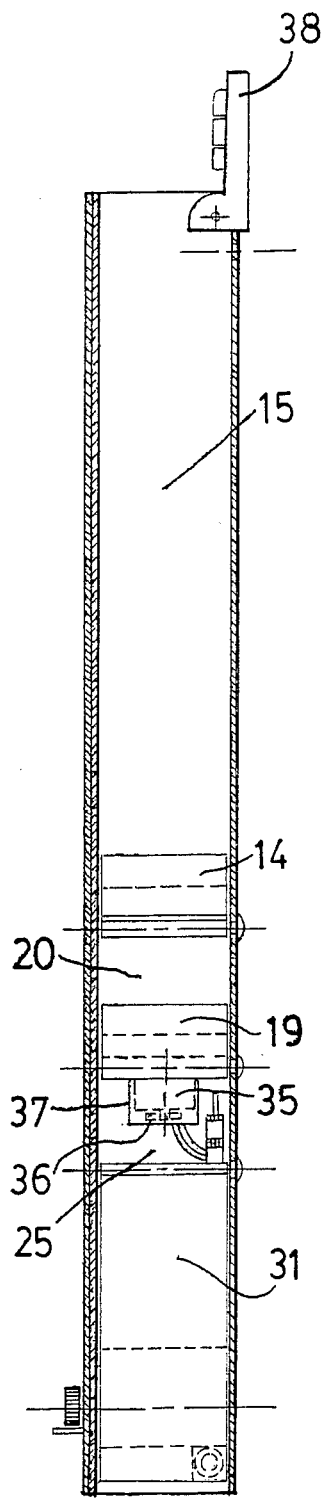
FIG. 3 is a right side sectional elevation view thereof.
Figure 4:
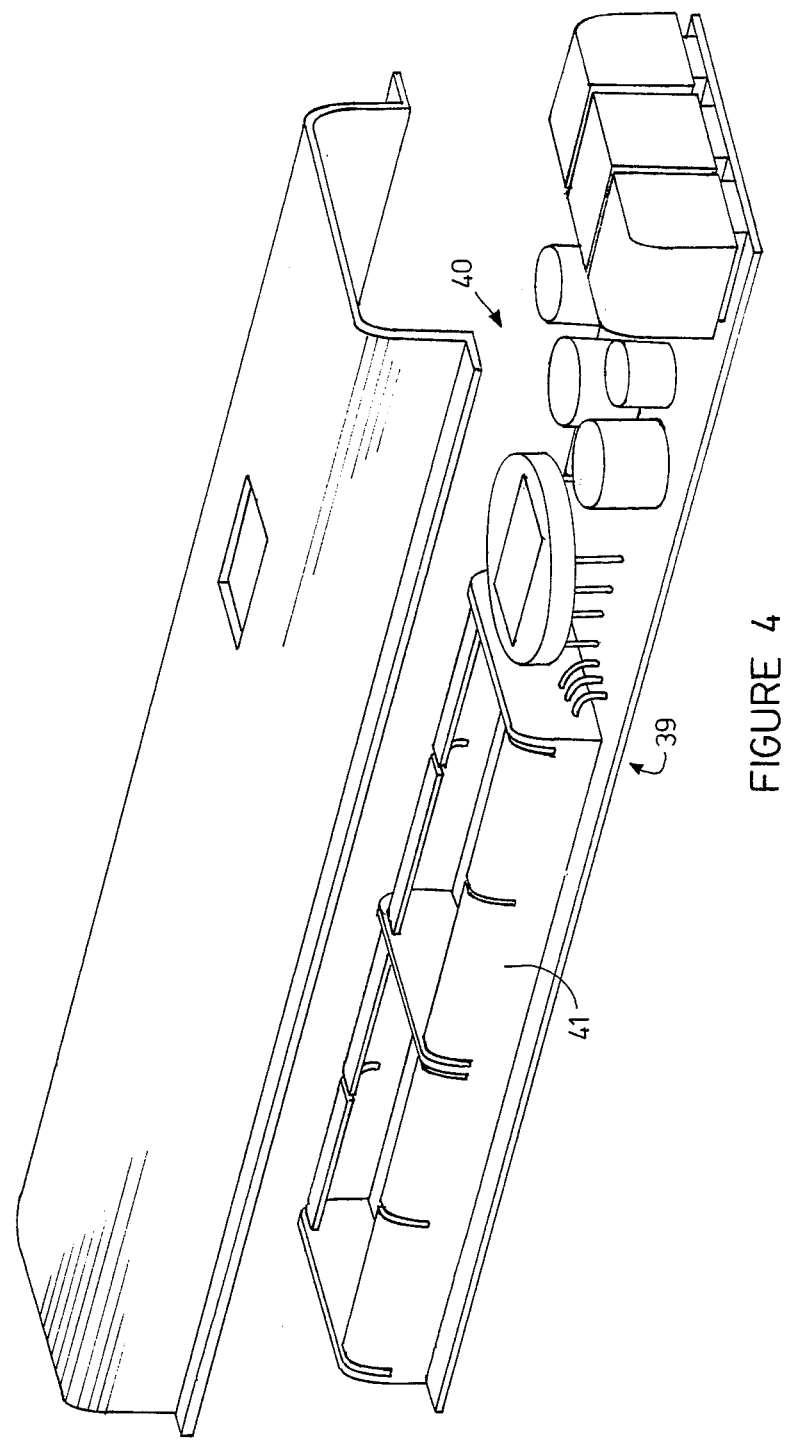
FIG. 4 is a perspective view of an electronic control timer and battery mounting device for the apparatus according to the present invention, and FIG. 5A, 5B and 5C inclusive are front sectional views of the apparatus according to the present invention showing its operation.

Referring now to the drawings, the feeder according to the present invention has a main body 10 generally rectangular in shape consisting of a back support 11 having a U-shaped cross section, and a front plate 12 mounted to the back support 11 either by screws or engaging slots. The back support 11 may be made of plastic or metal and the front plate 12 is preferrably made of transparent plastic material such that the content in the feeder is visible therethrough. Also, the proper operation of the feeder may be readily observed. Suitable openings may be provided in the back support 11 for mounting it to a wall or other base supports by screws or similar means. An angled cut out is formed at the lower right hand corner of both the back support 11 and the front plate 12. When these two parts are mounted together an oblique angled dispensing opening 13 is formed by the angled cut outs.

A holding platform 14 is provided in the body 10 to form a storage chamber 15 in the upper portion of the body 10 for storing a large amount of pet food pellets. The holding platform 14 slopes from the left side wall downwardly towards the right side and it has a free end located in a spaced manner from the right side wall to form a hopper opening 16 at the bottom right side of the storage chamber 15. The holding platform 14 may be formed by an L-shaped panel as shown having an integral sleeve 17 formed in its underside to facilitate mounting of the holding platform by a bolt 18 extending through the rear wall of the back support 11 to engage the sleeve 17. Additional screws through the left side wall of the back support 11 may be provided to engage the left flange portion of the holding platform 14. Alternatively, the holding platform 14 may be integrally formed in the back support 11. The holding platform 14 may have a sloping angle typically about 20 to 25 degrees from the horizontal plane depending upon the surface friction of the holding platform 14.

A vibration platform 19 is provided in the back support 11 in a spaced manner below the holding platform 14 as shown such that a middle chamber 20 is formed below the holding platform 14. The vibration platform 19 extends in a cantilever manner from the right side wall of the back support 11. Its left side free end is located in a spaced manner from the left side wall of the back support 11 to form a meter opening 21 at the bottom left side of the middle chamber 20. The vibration platform 19 has two sloping portions. The right portion located directly below the hopper opening 16 has a slope of typically about 20 to 30 degrees from the horizontal plane while the overhanging left portion has a slope typically of about 2 to 8 degrees from the horizontal plane depending upon the surface friction of the platform. An integral sleeve 22 may be formed at the underside of the vibration platform 19 at the junction between the two sloping portions, so that the vibration platform may be mounted to the back support 11 by a bolt 23. The integral sleeve 22 has a larger cross sectional dimension than the mounting bolt 23 so that the vibration platform 19 may move and vibrate relative to its mounting. Alternatively, the vibration platform 19 may be integrally formed in the back support 11 to provide the same function.

An adjustable bottom platform 24 is provided at the bottom of the main body 10 to form a feed chamber 25 below the vibration platform 19. The bottom platform 24 has a sloping top surface from left to right of typically about 25 to 30 degrees from the horizontal place as to direct the food pellets from the feed chamber 25 towards the dispensing opening 13. The bottom platform 24 has a downwardly extending ridge 26 having a threaded opening and a second opening formed therein. A securing knob 27 with a moulded on threaded bolt 28 is provided to engage with the threaded opening of the ridge 26 in the bottom platform 24 through a slot 29 in the front plate 12 for securing the bottom platform 24 may be adjusted up and down the slot 29 by operating the securing knob 27. A guide pin 30 is mounted in the second opening of the ridge 26 of the bottom platform 24. The guide pin 30 slidably engages with the slot 29 in the front plate 12 to guide the movement of the bottom platform 24 when the position of the latter is being adjusted up or down the slot 29.

A swingable trap door 31 is vertically and pivotally mounted to the back support 11 by bolt 32 at the dispensing opening 13. The trap door 31 is normally located vertically by gravity to loosely cover over the dispensing opening 13.

A solenoid 33 is provided adjacent the dispensing opening 13. The trap door 31 may be made of magnetizable metal such that when the solenoid 33 is actuated it will attract and hold the trap door 31 in a tightly closed position. Alternatively, if the door is made of plastic or non-magnetizable material a piece of magnetizable metal may be mounted to or imbedded in the trap door in the area adjacent to the solenoid 33 for the same purpose. It will be also appreciated by those skilled in the art that other electromechanical devices may be used for the same purpose for holding the trap door tightly closed.

A vibration device 34 is mounted at the underside of the overhanging portion of the vibration platform 19. The vibration device 34 may consist of a low voltage electric motor 35 having an offset weight mass 36 mounted on its shaft. Alternatively, as can be appreciated by those skilled in the art that other electrical vibration means such as a vibration coil can be used for the same purpose. The assembly of the motor 35 and the mass 36 is protected by a cover 37.

A lid 38 is pivotally provided at the top of the main body 10. A module 39 consisting of a direct current operated electronic control timer 40 and a battery box 41 may be provided in the lid 38 as shown so that normally when the lid is closed it provides protection to the module 39. The battery box 41 contains the direct current power supply for both the control timer 40, the motor 35, the vibration device 34. The advantages of using a direct current electrical system with the feeder are that firstly it is not subject to malfunctioning due to a power failure; secondly, it is inexpensive to produce; and thirdly, a reliable yet low power consumption direct current motor may be used for the vibration device 34. However, it can be appreciated by those skilled in the art that a mechanical control system or an alternate current system may be used to provide the same functions.

Figure 5C:
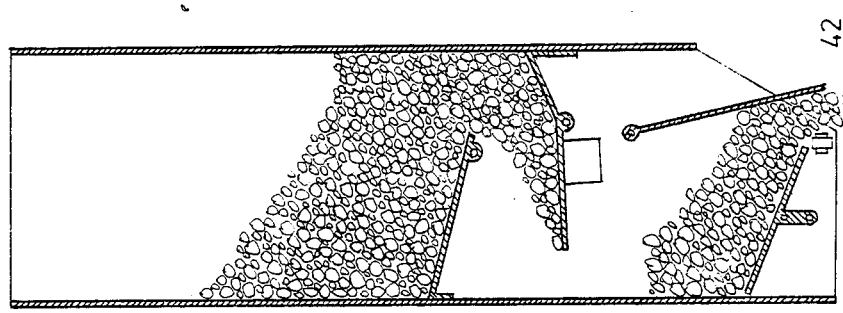
Figure 5B:
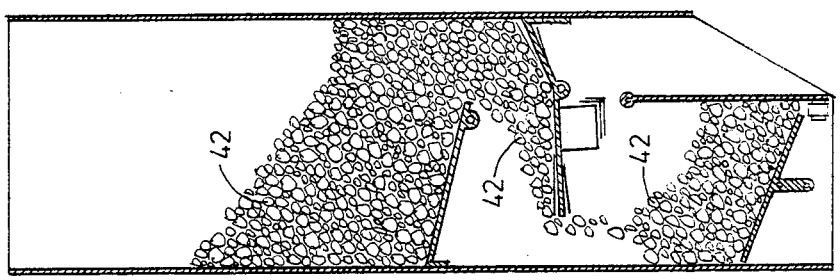
Figure 5A:
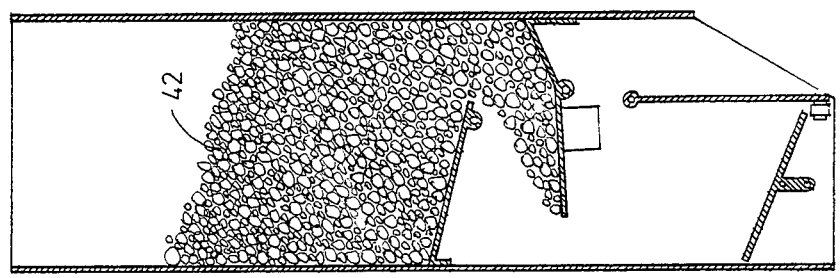

With reference now to FIGS. 5A through 5C, in operation, the dry pet food pellets 42 is placed in the storage chamber 15. Some food pellets will fall initially through the hopper opening 16 into the middle chamber 20 and rest on the vibration platform 19. However, due to the bulkiness of such dry food pellets they will eventually collect and amass at the hopper opening 16. As pre-set by the control timer 40, power is supplied to the electric motor 35 of the vibration device 34 causing a vibration motion to occur at the vibration platform 19. The vibration will cause the food pellets on the vibration platform 19 lin the middle chamber to fall through the meter opening 21 into the feed chamber 25. In the meantime, an equal amount of food pellets would then by gravity fall through the hopper opening 16 from the storage chamber 15 to refill the middle chamber 20. As the vibration device 34 is operated, power is also simultaneously supplied to the solenoid 33 for the same time period as controlled by the control timer 40. The solenoid 33 will thus hold the trap door 24 tightly closed while the food pellets are being transferred to the feed chamber 25. When the control timer 40 terminates the power to the vibration device 34, power supply is also terminated to the solenoid 33 to de-energize the latter so as to release its hold of the trap door 24 and to allow it to swing freely. Thus, by gravity, the food pellets in the feed chamber 25 will force the trap door 24 to swing open and the food pellets will fall into a feed bowl placed below the dispensing opening 13 for consumption by the animal.

The electronic control timer 40 may also supply power to an alarm which would sound during the operation of the vibration device and trap door latch. The sounding of the alarm will alert and eventually condition the animal to come for feeding whenever food is dispensed into the feed bowl.

While the invention has been particularly shown and described with reference to preferred embodiments thereof, it will be understood by those skilled in the art that various changes in form and details may be made therein without departing from the spirit and scope of the present invention.

What I claim as new and desire to protect by Letters Patent of the United States is:

1. An automatic animal dry food pellets dispensing apparatus comprising
   a generally rectangular housing having a bottom dispensing opening and a plurality of vertical consectively located chambers formed by at least three sloping platforms means disposed in said housing in a zig zag manner,
   said sloping platform means comprising a holding platform means extending slopingly downwardly from one side wall of said housing towards an opposite side wall and having an opening therein adjacent said opposite side wall,
   a middle platform means spaced below said holding platform means and extending from said opposite side wall slopingly and downwardly towards one side wall and having an opening therein adjacent to said one side wall,
   a bottom platform means spaced below said middle platform means and extending slopingly and downwardly from said one side wall to said dispensing opening,
   a vibration means mounted at said middle platform means, said vibration means being operative to cause transfer of food pellets located on said middle platform means to said bottom platform means for dispensing through said dispensing opening.

2. An automatic animal dry food pellets dispensing apparatus according to claim 1 wherein said opening in said holding platform means is formed by a lower free end of said holding platform means disposed spaced from said opposite side wall, and said opening in said middle platform means is formed by a lower free end of said middle platform means disposed spaced from said one side wall.

3. An automatic animal dry food pellets dispensing apparatus according to claim 2 including a pivotally mounted swingable trap door means disposed at said dispensing opening, and a holding means adapted at said dispensing opening, said holding means being operative selectively to maintain said trap door means in a closed position to retain said food pellets on said bottom platform means in said housing and to release said trap door means to facilitate exit by gravity of said food pellets from said bottom platform means through said dispensing opening.

4. An automatic aniaml dry food pellets dispensing apparatus according to claim 3 wherein said vibration means comprises an electromagnetic vibration device mounted at the underside of said middle platform means.

5. An automatic animal dry food pellets dispensing apparatus according to claim 4 wherein said electromagnetic vibration device is a direct current motor means having a rotatable shaft with an offset weight mass mounted thereon.

6. An automatic animal dry food pellets dispensing apparatus according to claim 5 wherein said holding means of said trap door means is an electric solenoid.

7. An automatic animal dry food pellets dispensing apparatus according to claim 6 including an electrical supply means operative to actuate said motor means and said solenoid means, a control timer means operative selectively to connect said electrical supply means to said motor means and said solenoid means simultaneously at a predetermined time and for a predetermined length of time.

8. An automatic animal dry food pellets dispensing apparatus comprising
   a generally rectangular housing comprising a back support member having a U-shaped cross section, and a front panel member mounted to said back support member,
   said housing having a bottom opening at a bottom corner therein, and a plurality of vertical consecutively located chambers therein formed by at least three sloping platform means disposed in a zig zag manner, said sloping platform means including a top holding platform means extending slopingly downwardly from one side wall of said housing towards an opposite side wall and having a free end therein disposed in a spaced manner from said opposite side wall to form a opening therewith, a middle platform means disposed in a spaced manner below said top holding platform means, said middle platform means having a first portion extending slopingly downwardly from said opposite side wall and a second portion having a lesser slope than said first portion and extending slopingly and downwardly from said first portion towards said one side wall and having a free end therein disposed in a spaced manner from said one side wall, a bottom platform means disposed in a spaced manner below said middle platform means and extending slopingly downwardly from said one side wall towards said bottom opening.
   a vibration means adapted at said second portion of said middle platform means and being operative to provide a vibration motion at said middle platform means,
   a control timer means operative to actuate said vibration means at a predetermined time and for a predetermined length of time.

9. An automatic animal dry food pellets dispensing apparatus according to claim 8 wherein said bottom platform means is adjustable selectively to locate at a selected distance below said middle platform means for selecting the amount of food to be dispensed.

10. An automatic animal dry food pellets dispensing apparatus according to claim 9 including a trap door means vertically mounted in a swingable manner at said bottom opening, a holding means located adjacent said bottom opening, said holding means being operative by said control timer means to hold said trap door means in a tightly closed position while said vibration means is actuated and to release said trap door means when said vibration means is de-activated.

11. An automatic animal dry food pellets dispensing apparatus according to claim 10 wherein said housing has an opened top having a lid means hingedly mounted thereon, and said control timer means being mounted to said lid means.

12. An automatic animal dry food pellets dispensing apparatus comprising
    a generally rectangular housing comprising a back support member having a U-shaped cross section, and a front panel member mounted to the front of said back support member, said housing having a bottom dispensing opening located in a bottom corner therein, and vertical consecutively located chambers therein formed by three sloping platform means disposed in a zig zag manner, said sloping platform means including top holding platform means mounted to said back support means and extending slopingly downwardly from one side wall of said housing towards an opposite side wall and having a free end therein disposed in a spaced manner from said opposite side wall to form a hopper opening therewith, a middle platform means movably mounted to said back support means and disposed in a spaced manner below said top holding platform means, said middle platform means having a first portion extending slopingly downwardly from said opposite side wall and a second portion having a lesser slope than said first portion and extending slopingly and downwardly from said first portion towards said one side wall and having a free end therein disposed in a spaced manner from said one side wall to form a meter opening therewith, an adjustable bottom platform means disposed in a spaced manner below said middle platform means and extending slopingly downwardly from said one side wall towards said dispensing opening, said bottom platform means being adjustably mounted to said front panel member and being adjustable to locate at a selected distance below said middle platform means for accommodating a selected volume of food pellets.

a vibration means mounted underneath said second portion of said middle platform means and being operative to provide a vibration motion at said middle platform means, a trap door means vertically mounted in a swingable manner at said dispensing opening, said trap door means having a magnetizable portion therein, an electromagnetic means disposed in said housing and located adjacent to said magnetizable portion of said trap door means, said electromagnetic means being operative to cooperate with said magetizable portion of said trap door means to hold said trap door means in a tightly closed position, a power supply means operative to energize said vibration means and said electromagnetic means, a control timer means operative to connect said vibration means and said electromagnetic means to said power supply means at a predetermined time and for a predetermined length of time.

13. An automatic animal dry food pellets dispensing apparatus according to claim 12 including a alarm means operative by said control timer means to emit a sound signal while said vibration means and said electromagnetic means are being energized.

14. An automatic animal dry food pellets dispensing apparatus according to claim 13 wherein said top holding platform means has a slope of from 20 to 25 degrees with respective to the horizontal plane, said first portion of said middle platform means has a slope of 20 to 30 degrees with respect to the horizontal plane, said second portion of said middle platform means has a slope of from 2 to 8 degrees with respect to the horizontal plane.

* * * * *